United States Patent
Roth et al.

(10) Patent No.: US 11,702,714 B2
(45) Date of Patent: Jul. 18, 2023

(54) HIGH FRACTURE TOUGHNESS, HIGH STRENGTH, PRECIPITATION HARDENABLE STAINLESS STEEL

(71) Applicant: CRS HOLDINGS, INC., Wilmingon, DE (US)

(72) Inventors: Wesley T. Roth, Lititz, PA (US); Alberto O. Polar-Rosas, Reading, PA (US); Andrea Ricci, Senigallia (IT); Stephane A. Forsik, Reading, PA (US)

(73) Assignee: CRS HOLDINGS, LLC, Wilmington, DE (US)

( * ) Notice: Subject to any disclaimer, the term of this patent is extended or adjusted under 35 U.S.C. 154(b) by 45 days.

(21) Appl. No.: 17/186,813

(22) Filed: Feb. 26, 2021

(65) Prior Publication Data

US 2021/0371945 A1 Dec. 2, 2021

Related U.S. Application Data

(60) Provisional application No. 62/981,779, filed on Feb. 26, 2020.

(51) Int. Cl.
*B33Y 70/00* (2020.01)
*B33Y 40/20* (2020.01)
(Continued)

(52) U.S. Cl.
CPC .............. *C21D 8/005* (2013.01); *B22F 10/64* (2021.01); *B22F 10/66* (2021.01); *B33Y 40/20* (2020.01);
(Continued)

(58) Field of Classification Search
CPC ........ C21D 8/005; C21D 6/004; C21D 6/005; C21D 6/008; C21D 2211/008; C21D 1/18;
(Continued)

(56) References Cited

U.S. PATENT DOCUMENTS 5,855,844 A 1/1999 Martin
6,238,455 B1 5/2001 Brown et al.
(Continued)

FOREIGN PATENT DOCUMENTS

| CN | 103820729 A | 5/2014 |
| DE | 2744047 A1 | 4/1979 |
| WO | 2012002208 A1 | 1/2012 |

OTHER PUBLICATIONS

EPO, International Search Report, PCT/2021/019879, dated May 18, 2021; 6 pages.

*Primary Examiner* — Anthony M Liang
*Assistant Examiner* — Danny N Kang
(74) *Attorney, Agent, or Firm* — Dann, Dorfman, Herrell and Skillman, P.C.

(57) ABSTRACT

A precipitation hardenable, martensitic stainless steel is disclosed. The alloy has the following broad composition in weight percent.

| Ni | 10.5-12.5 |
| Co | 1.0-6.0 |
| Mo | 1.0-4.0 |
| Ti | 1.5-2.0 |
| Cr | 8.5-11.5 |
| Al | Up to 0.5 |
| Mn | 1.0 max. |
| Si | 0.75 max. |
| B | 0.01 max. |

The balance of the alloy is iron and the usual impurities found in commercial grades of precipitation hardenable martensitic stainless steels as known to those skilled in the state of the art in melting practice for such steels. A method of making parts from the alloy and an article of manufacture made from the alloy are also described.

32 Claims, 2 Drawing Sheets

(51) Int. Cl.
*B22F 10/66* (2021.01)
*B22F 10/64* (2021.01)
*C22C 38/02* (2006.01)
*C22C 38/50* (2006.01)
*C21D 8/00* (2006.01)
*C21D 6/00* (2006.01)
*C22C 38/00* (2006.01)
*C22C 38/04* (2006.01)
*C22C 38/06* (2006.01)
*C22C 38/44* (2006.01)
*C22C 38/52* (2006.01)
*C22C 38/54* (2006.01)

(52) U.S. Cl.
CPC .............. *B33Y 70/00* (2014.12); *C21D 6/004* (2013.01); *C21D 6/005* (2013.01); *C21D 6/008* (2013.01); *C22C 38/002* (2013.01); *C22C 38/02* (2013.01); *C22C 38/04* (2013.01); *C22C 38/06* (2013.01); *C22C 38/44* (2013.01); *C22C 38/50* (2013.01); *C22C 38/52* (2013.01); *C22C 38/54* (2013.01); *C21D 2211/008* (2013.01)

(58) Field of Classification Search
CPC . C21D 6/00; C21D 6/007; C21D 6/02; C21D 6/04; C21D 7/13; B22F 10/64; B22F 10/66; B33Y 40/20; B33Y 70/00; C22C 38/002; C22C 38/02; C22C 38/04; C22C 38/06; C22C 38/44; C22C 38/50; C22C 38/52; C22C 38/54; C22C 33/0285; C22C 38/004; Y02P 10/25
See application file for complete search history.

(56) References Cited

U.S. PATENT DOCUMENTS

| | | |
|---|---|---|
| 6,630,103 B2 | 10/2003 | Martin et al. |
| 7,879,159 B2 | 2/2011 | Wright et al. |
| 8,097,098 B2 | 1/2012 | Montagnon |
| 2012/0321478 A1 | 12/2012 | Oikawa et al. |
| 2016/0289805 A1 | 10/2016 | Puech |
| 2016/0319406 A1 | 11/2016 | Wert et al. |
| 2020/0071782 A1 | 3/2020 | Tian et al. |

HIGH FRACTURE TOUGHNESS, HIGH STRENGTH, PRECIPITATION HARDENABLE STAINLESS STEEL

CROSS REFERENCE TO RELATED APPLICATION

This application claims the benefit of U.S. Provisional Patent Application No. 62/981,779, filed Feb. 26, 2020, the entirety of which is incorporated herein by reference.

BACKGROUND OF THE INVENTION

Field of the Invention

This invention relates to a precipitation hardenable, martensitic stainless steel alloy that is capable of providing very high strength and fracture toughness together with corrosion resistance. The superior combination of fracture toughness and strength in combination with corrosion resistance makes this alloy particularly suitable for aerospace components, specifically for aircraft landing gear. The alloy can be used to manufacture other articles that require the combination high strength and fracture toughness provided by the alloy.

Description of the Related Art

The aerospace industry has been looking for a high strength stainless steel alloy for use in aircraft landing gear for many years. A known alloy currently used for the commercial aircraft landing gear application is the 300M alloy. The 300M alloy can be quenched and tempered to provide an ultimate tensile strength of about 280 ksi (1930 MPa) with good ductility, as represented by an elongation greater than 10%. The 300M alloy also provides a $K_{Ic}$ fracture toughness of 50-60 ksi$\sqrt{in}$ (55-66 MPa$\sqrt{m}$). However, the 300M alloy does not provide effective corrosion resistance. Therefore, it has been necessary to plate the landing gear components with a corrosion resistant metal such as cadmium. Cadmium is a highly toxic, carcinogenic material and its use has presented significant health and environmental risks in the manufacture and maintenance of aircraft landing gear and other exposed components made from the 300M alloy. The corrosion resistance desired for the aircraft landing gear application includes general corrosion resistance, pitting corrosion resistance, and resistance to stress corrosion cracking.

Additionally, for critical applications involving high strength and high toughness, as in the case of aerospace landing gear, the relevant material specifications call for a design based on a critical flaw size. Many of those specifications require a fracture toughness-to-ultimate tensile strength ratio, $K_{Ic}$:UTS, that must be met by qualifying material. Although some of the known corrosion resistant, precipitation hardenable alloys are capable of meeting the strength, ductility, and corrosion resistance requirements for the landing gear application, they have not been able to provide fracture toughness greater than about 50 ksi$\sqrt{in}$ (55 MPa$\sqrt{m}$), or greater than about 60 ksi$\sqrt{in}$ (65 MPa$\sqrt{m}$). Nor are they able to provide a fracture toughness-to-UTS ratio equivalent to or better than 300M. For example, the 300M alloy is known to provide a fracture toughness-to-tensile strength ratio of about 0.20-0.26 $\sqrt{in}$, and examples of the alloy disclosed in US2016/02898056A1 provide ratios of only about 0.20 $\sqrt{in}$ and 0.21 $\sqrt{in}$.

Accordingly, there is a need for a corrosion resistant steel alloy to qualify as a direct replacement for the 300M alloy without a major design modification in terms of mechanical functionality and which provides the combination of strength and fracture toughness required for the aerospace landing gear application and conventionally provided by the 300M alloy.

BRIEF SUMMARY OF THE INVENTION

In accordance with a first aspect of the present invention there is provided a precipitation hardenable, martensitic stainless steel having the following broad, intermediate, and preferred compositions in weight percent.

|    | Broad      | Intermediate | Preferred    |
|----|------------|--------------|--------------|
| Ni | 10.5-12.5  | 11.0-12.2    | 11.4-12.0    |
| Co | 1.0-6.0    | 1.5-5.5      | 2.0-5.0      |
| Mo | 1.0-4.0    | 2.0-3.0      | 2.25-2.75    |
| Ti | 1.5-2.0    | 1.55-1.8     | 1.60-1.75    |
| Cr | 8.5-11.5   | 8.75-10.5    | 9.0-10.0     |
| Al | Up to 0.5  | Up to 0.3    | Up to 0.2    |
| C  | 0.03 max.  | 0.02 max.    | 0.015 max.   |
| Mn | 1.0 max.   | 0.25 max.    | 0.10 max.    |
| Si | 0.75 max.  | 0.25 max.    | 0.10 max.    |
| Nb | 0.10 max.  | 0.10 max.    | 0.10 max.    |
| P  | 0.04 max.  | 0.015 max.   | 0.01 max.    |
| S  | 0.020 max. | 0.01 max.    | 0.005 max.   |
| B  | 0.01 max.  | 0.001-0.005  | 0.0015-0.0035|
| N  | 0.03 max.  | 0.015 max.   | 0.010 max.   |

The balance of the alloy is iron and the usual impurities found in commercial grades of precipitation hardenable martensitic stainless steels as known to those skilled in the state of the art in melting practice for such steels.

The foregoing tabulation is provided as a convenient summary and is not intended thereby to restrict the lower and upper values of the ranges of the individual elements of the alloy of this invention for use in combination with each other, or to restrict the ranges of the elements for use solely in combination with each other. Thus, one or more of the element ranges of the broad composition can be used with one or more of the other ranges for the remaining elements in the preferred composition. In addition, a minimum or maximum for an element of a broad, intermediate, or preferred embodiment can be used with the maximum or minimum for that element from another broad, intermediate, or preferred embodiment. Moreover, the alloy according to this invention may comprise, consist essentially of, or consist of the constituent elements described above and as described throughout this specification.

In accordance with another aspect of this invention there is provided a method of manufacturing a metal part or component made from the martensitic precipitation hardenable stainless steel alloy described above. The method includes the step of providing an ingot having the composition of the martensitic precipitation hardenable stainless steel alloy described above. The method also includes the steps of heating the ingot at a temperature of about 2000° F. (1093° C.) to about 2400° F. (1315° C.) for a time sufficient to homogenize said ingot. The homogenized ingot is then hot-worked to provide a near-net shape part or an intermediate product form. The method further includes heat treating the part or intermediate product form by annealing the near-net shape part by heating the part or product form at a temperature of about 1700° F. (927° C.) to about 1900° F. (1038° C.) for a preselected period of time. The part or product form is then quenched from the annealing temperature to below about −100° F. (−73° C.) to ensure full martensitic transformation of the alloy matrix. The method further includes the step of age hardening the quenched part by heating at a temperature of 900° F. (482° C.) to about 1150° F. (621° C.) for a time selected to obtain a combination of high tensile strength, good fracture toughness, and good corrosion resistance.

In accordance with a further aspect of this invention there is provided an article of manufacture made from the alloy described in the foregoing table. The article is characterized by having high strength and high fracture toughness, together with good corrosion resistance. The article according to the invention provides an ultimate tensile strength of at least about 280 ksi (1930 MPa), a plane strain fracture toughness of at least about 60 ksi$\sqrt{\text{in}}$ (65 MPa$\sqrt{\text{m}}$), and a fracture toughness to tensile strength ratio of about 0.25-0.3 $\sqrt{\text{in}}$ ($\sqrt{\text{m}}$), in the solution annealed and age-hardened condition.

Here and throughout this specification, the term "percent" or the symbol "%" means weight percent or mass percent, unless otherwise indicated. The term "tensile strength" means the ultimate tensile strength as that property is generally defined and understood by those skilled in the art. Regarding fracture toughness, the symbol "$K_{Ic}$" refers to fracture toughness measured under predominantly linear-elastic, plane-strain conditions. The symbol "$K_Q$" refers to fracture toughness measured under predominantly linear-elastic conditions. Under the experimental conditions applied, the difference between these two quantities is similar to the reproducibility standard deviation of the method (ASTM E399). Thus, the term "fracture toughness" is used herein as a general term to indicate both "$K_{Ic}$" and "$K_Q$".

DETAILED DESCRIPTION

The alloy according to the present invention contains at least about 10.50% nickel because nickel contributes to stabilization of the austenite phase. A stable austenite phase facilitates the transformation of the alloy to a dislocation dense martensite during quenching, while avoiding the formation of delta ferrite in the alloy. A sufficient concentration of nickel is also necessary because nickel participates in the formation of the primary strengthening phase, $Ni_3Ti$. Moreover, nickel ensures good toughness through the promotion of a reverted austenite, interlath austenite, and retained austenite during the aging and quenching of the alloy. Nickel also lowers the ductile-brittle transition temperature (DBTT) to well below room temperature to provide the good impact toughness that is a characteristic of the alloy. Preferably, the alloy contains at least about 11.0% nickel, and better yet, at least about 11.4% nickel. Too much nickel results in suppression of the martensitic transformation start temperature (Ms) to undesirably far below room temperature, which prohibits sufficient transformation to achieve the desired mechanical properties. Therefore, the alloy contains not more than about 12.5% nickel. Preferably, the alloy contains not more than about 12.2% nickel, and better yet, not more than about 12.0% nickel.

At least about 1.0%, preferably at least about 1.5%, and better still, at least about 2.0% cobalt is present in this alloy. Cobalt benefits the alloy's properties in several important ways. More specifically, cobalt delays the dislocation recovery that occurs during aging heat treatment of the alloy. The retardation of the dislocation recovery phenomenon benefits heterogeneous nucleation of a fine dispersion of strengthening precipitates in the alloy matrix. In addition, cobalt interacts with molybdenum to reduce the solubility of molybdenum in the alloy which leads to improved coherency between the matrix and the precipitates. The improved coherency benefits the fracture toughness provided by the alloy. Furthermore, cobalt stabilizes austenite in the alloy at elevated temperatures and contributes to solid solution strengthening of the alloy. On the other hand, when more than about 6% cobalt is present in the alloy the corrosion resistance provided by the alloy is adversely affected. Cobalt interacts with chromium to form Cr-rich phases during aging heat treatment thereby depleting chromium from the matrix material. Accordingly, the cobalt is limited to not more than about 6.0%, preferably to not more than about 5.5%, and for best results, to not more than about 5.0% in this alloy.

This alloy contains at least about 1.5% titanium to benefit the strength provided by the alloy. Titanium combines with nickel to form the primary strengthening phase, $Ni_3Ti$, during an age hardening heat treatment. Preferably, the alloy contains at least about 1.55% titanium, and for best results, at least about 1.6% titanium. Too much titanium causes an undesirable increase of the solvus temperature of Laves phase that forms in the alloy, to the point where it is not possible to sufficiently dissolve the Laves phases without undesirable grain growth. Therefore, titanium is restricted to not more than about 2.0%, preferably to not more than about 1.8%, and for best results, to not more than about 1.75% in this alloy.

Chromium benefits the corrosion resistance provided by the alloy of this invention. Toward that end, the alloy contains at least about 8.5% chromium. Preferably, the alloy contains at least about 8.75%, and better yet, at least about 9.0% chromium. Too much chromium lowers the $M_s$ temperature of the alloy which inhibits the formation of martensite in the alloy matrix during quenching, thereby adversely affecting the tensile strength provided by the alloy. Accordingly, chromium is limited to not more than about 11.5% in this alloy. Preferably, the alloy contains not more than about 10.5% and better yet, not more than about 10.0% chromium.

At least about 1.0% molybdenum is present in this alloy to benefit the strength provided by the alloy by participating in the precipitation of the strengthening phases, such as R phase, during age hardening of the alloy. Molybdenum also contributes to the pitting and crevice corrosion resistance provided by the alloy. Toward those ends, the alloy preferably contains at least about 2.0% and for best results, at least about 2.25% molybdenum. Too much molybdenum causes a reduction of the $M_s$ temperature such that full martensitic transformation is inhibited. Additionally, too much molybdenum may promote the formation of Mo-rich topologically closed-packed (TCP) phases that reduce the availability of molybdenum for localized corrosion resistance. For that reason, the alloy contains not more than about 4.0%, better yet, not more than about 3.0%, and preferably not more than about 2.75% molybdenum.

Up to about 0.5% or up to about 0.3% aluminum may be present in this alloy as a residual from deoxidizing additions during primary melting of the alloy. Aluminum can improve the flowability of the alloy during casting. A small amount of aluminum is believed to increase the $M_s$ temperature of the alloy which helps to ensure full transformation to the martensite phase. The alloy may optionally contain at least about 0.15% aluminum to benefit the yield and tensile strengths provided by the alloy. Too much aluminum is detrimental to the fracture toughness provided by the alloy. Therefore, when positively added, aluminum is restricted to not more than about 0.25% and preferably, to not more than about 0.20% in this alloy. For applications requiring maximum toughness, the alloy contains not more than about 0.025% aluminum.

Other elements such as boron, manganese, and silicon may be present in controlled amounts to benefit other desirable properties provided by this alloy. More specifically, up to about 0.01% boron, better yet up to about 0.005% boron, and preferably up to about 0.0035% boron can be present in the alloy to benefit the hot workability of the alloy. In order to provide the desired effect, at least about 0.001% and preferably at least about 0.0015% boron is present in the alloy. Up to about 1.0%, better yet up to about 0.5%, and still better up to about 0.25%, manganese may be present in the alloy as a residual from charge additions during melting. Up to about 0.75%, better yet up to about 0.5%, or still better, up to about 0.25% silicon can be present in the alloy as residuals from scrap charge materials or deoxidizing additions. Such additions are beneficial when the alloy is not vacuum melted. Manganese and/or silicon are preferably kept at low levels because they can adversely affect the toughness and the corrosion resistance provided by the alloy. Too much manganese and/or silicon also adversely affects the austenite-martensite phase balance in the matrix material. Therefore, manganese and silicon are preferably limited to not more than about 0.10% each in this alloy. Additionally, the amount of Nb should be limited to no more than about 0.10% to reduce Nb's adverse influence on the toughness of the alloy or increase the alloy's segregation tendency by promoting high-temperature Laves phases.

The balance of the alloy is essentially iron and the usual impurities found in commercial grades of alloys intended for similar service or use. The levels of such elements are controlled so as not to adversely affect the combination of properties provided by the alloy.

In particular, too much carbon and/or nitrogen impair the corrosion resistance and deleteriously affect the toughness provided by this alloy. Accordingly, not more than about 0.03%, better yet not more than about 0.02%, and preferably not more than about 0.015% carbon is present in the alloy. Also, not more than about 0.030%, better yet not more than about 0.015%, not more than about 0.010% nitrogen is present in the alloy. When carbon and/or nitrogen are present in larger amounts, the carbon and/or nitrogen bonds with titanium to form titanium-rich non-metallic inclusions. That reaction inhibits the formation of the nickel-titanium-rich phase which is a primary factor in the high strength provided by this alloy.

Phosphorus and sulfur are also inevitably present from alloying additions made during primary melting. However, the amounts of phosphorus and sulfur are controlled. In particular, phosphorus is maintained at a low level because of its adverse effect on the toughness and corrosion resistance properties provided by the alloy. In this regard, not more than about 0.04%, better yet not more than about 0.015%, and preferably, not more than about 0.01% phosphorus is present in this alloy. Sulfur is restricted to not more than about 0.020%, better yet to not more than about 0.01%, and preferably to not more than about 0.005% in this alloy. Greater amounts of sulfur promote the formation of titanium-rich non-metallic inclusions which inhibit the strengthening effect otherwise provided by titanium because less titanium is available to form the primary strengthening phase during age hardening heat treatment. Also, amounts of sulfur in excess of those limits adversely affect the hot workability and corrosion resistance provided by the alloy. Moreover, such amounts of sulfur adversely affect the toughness of the alloy, particularly in the transverse direction.

When present, sulfur and phosphorus tend to segregate to the grain boundaries of the alloy. Such segregation reduces grain boundary adhesion which adversely affects the fracture toughness, notch toughness, and notch tensile strength of the alloy. A product form of this alloy having a cross-section greater than about 0.7 in$^2$ (4 cm$^2$), does not undergo sufficient thermomechanical processing to homogenize the alloy and neutralize the adverse effect of sulfur and phosphorus concentrating in the grain boundaries. For such large section size products, a small addition of cerium is preferably made to the alloy during melting to benefit the fracture toughness, notch toughness, and notch tensile strength of the alloy by combining with sulfur and phosphorus to facilitate their removal from the alloy. For the sulfur and phosphorus to be adequately scavenged from the alloy, the ratio of the amount of cerium to the amount of sulfur present in the alloy (Ce:S) is at least about 1:1, better yet at least about 2:1, and preferably at least about 3:1. Only a trace amount (i.e., <0.001%) of cerium need be retained in the alloy for the benefit of the cerium addition to be realized. However, to ensure that enough cerium has been added and to prevent too much sulfur and phosphorus from being retained in the final product, at least about 0.001% and better yet at least about 0.002% cerium is preferably present in the alloy. Too much cerium may adversely affect the hot workability of the alloy and its fracture toughness. Therefore, cerium is restricted to not more than about 0.025%, better yet to not more than about 0.015%, and preferably to not more than about 0.010% in the alloy. Alternatively, the cerium-to-sulfur ratio of the alloy is not more than about 15:1, better yet not more than about 12:1, and preferably not more than about 10:1. Other rare earth metals such as lanthanum and yttrium, as well as calcium and magnesium can be present in the alloy in place of some or all of the cerium.

No special techniques are required in melting, casting, or mechanically working the alloy of the present invention. The alloy of this invention is preferably produced by vacuum induction melting (VIM). When desired, the alloy may be refined by a double melting process in which the VIM ingot is remelted by electroslag remelting (ESR) or by vacuum arc remelting (VAR). For the most critical applications, a triple-melt process consisting of VIM followed by ESR and then VAR can be used. Alternatively, a melt process consisting of VIM followed by multiple VAR melting, or any combination of ESR and VAR melting in an appropriate sequence as may be known to those skilled in the state of the art, can be used.

The alloy can be cast as an ingot which is hot worked to provide a near net shape product form such as billet or bar. Although the alloy of the present invention can be hot or cold worked, cold working enhances the mechanical strength of the alloy. Prior to hot working, the alloy ingot is preferably homogenized by heating the ingot at a temperature of about 2000° F. to about 2400° F. for a time selected to equalize the temperature of the ingot.

Hot working is preferably carried out from the homogenization temperature down to a finish temperature of about 1900° F. (1038° C.). If a further reduction in cross-sectional area is needed, the alloy can be reheated to about 1900° F.-2400° F. (1038° C.-1315° C.) prior to further hot working. Hot working can be carried out by such techniques as press forging and rotary forging.

The precipitation hardenable alloy of the present invention is solution annealed and then age hardened to develop the desired strength. The solution annealing temperature should be high enough to bring into solution enough titanium and molybdenum to produce the desired hardening response during the aging heat treatment. However, if the solution annealing temperature is too high, it will impair the fracture toughness of the alloy by promoting excessive grain growth. Typically, the alloy of the present invention is solution annealed at about 1700° F.-1900° F. (927° C.-1038° C.) for 1 hour and then quenched. Quenching may be carried out with any known media, including but not limited to, water, oil, or inert gas. Preferably, the quenching medium is selected to provide a quenching rate of about 60° C./second (° C./s), better yet about 80° C./s, and more preferably about 100° C./s.

Preferably, this alloy is subjected to a deep chill treatment after it is quenched in order to further develop the high strength of the alloy. The deep chill treatment cools the alloy to a temperature sufficiently below the martensite finish temperature (Mf) to ensure the completion of the martensite transformation. Typically, a deep chill treatment consists of cooling the alloy to below about −100° F. (−73° C.) for about 1 hour. However, the need for a deep chill treatment will be affected, at least in part, by the martensite finish temperature of the alloy. If the martensite finish temperature is sufficiently high, the transformation to a martensitic structure will proceed without the need for the deep chill treatment. In addition, the need for a deep chill treatment may also depend on the cross-sectional size of the piece being manufactured. As the cross-sectional size of the piece increases, segregation in the alloy becomes more significant and the use of a deep chill treatment becomes more beneficial. Further, the length of time that the piece is chilled may need to be increased for large pieces in order to complete the transformation to martensite. For example, it has been found that in a piece having a large cross-sectional area (i.e., 0.7 in$^2$ or more), a deep chill treatment lasting about 8 to 16 hours is preferred for developing the high strength that is characteristic of this alloy.

The alloy of the present invention is age hardened in accordance with techniques used for the known precipitation hardening, stainless steel alloys, which techniques are known to those skilled in the art. For example, the alloys can be aged at a temperature between about 900° F. (482° C.) and about 1150° F. (621° C.) for about 4 to about 24 hours. After the aging treatment, the material is cooled in a medium selected to produce a cooling rate of about 60° C./s, or preferably about 80° C./s, or more preferably about 100° C./s. A slower cooling rate can be utilized, although the mechanical properties cannot be assured. The alloy according to the invention is capable of providing an ultimate tensile strength of at least about 280 ksi and a fracture toughness of at least about 60 ksi in the solution annealed and age-hardened condition. The alloy is further characterized by having good resistance to general corrosion as determined by the salt spray test (ASTM B117).

The alloy of the present invention can be formed into a variety of product shapes for a wide variety of uses and lends itself to the formation of billets, bars, rod, wire, or plate using conventional practices. In the solution annealed condition, this alloy is processable and sufficiently ductile enough to be processed to small gauge sheet and strip. Furthermore, cold working into sheet and strip followed by aging will lead to enhanced mechanical strength, but at some cost to the toughness and ductility properties. In addition, the alloy can be produced by powder metallurgy techniques. Metal powder made from the alloy according to the present invention can be processed into a complex, semi-finished state close to the final product as known to those skilled in the art. In that regard, the metal powder can be processed or manufactured into a semi-finished part by powder metallurgy or additive manufacturing techniques.

The alloy of the present invention is useful in a wide range of practical applications which require an alloy having a good combination of corrosion resistance, high strength, and good toughness. In particular, the alloy of the present invention can be used to produce structural members for aircraft, including but not limited to landing gear components, flap tracks, and fasteners. The alloy is also well suited for use in medical and dental applications such as dental tools, medical scrapers, and cutters, as well as suture needles. The alloy is also suitable for use in consumer sport applications such as golf club heads.

Working Examples

In order to demonstrate the novel combination of high strength and fracture toughness provided by the alloy according to this invention, Examples 1-13, which embody the alloy of this invention, were vacuum induction melted (VIM). The compositions of Examples 1-13 are shown in Table 1 below in weight percent.

TABLE 1

| Example | Ni | Cr | Mo | Ti | Co | Al | Other |
|---|---|---|---|---|---|---|---|
| 1 | 11.88 | 9.24 | 2.48 | 1.73 | 2.79 | 0.17 | |
| 2 | 11.8 | 9.5 | 2 | 1.7 | 2.5 | 0.19 | |
| 3 | 11.4 | 9.5 | 2.75 | 1.65 | 3 | 0.2 | |
| 4 | 12.1 | 9.2 | 2 | 1.7 | 2 | 0 | |
| 5 | 11.7 | 9.2 | 3 | 1.7 | 2 | 0 | |
| 6 | 11.1 | 9.2 | 3 | 1.7 | 5 | 0 | |
| 7 | 11.6 | 9.2 | 2 | 1.7 | 5 | 0 | |
| 8 | 12.1 | 9 | 2.5 | 1.7 | 1.4 | 0 | |
| 9 | 11.2 | 9.2 | 2.5 | 1.7 | 5.6 | 0 | |
| 10 | 11.9 | 9.2 | 1.79 | 1.7 | 3.5 | 0 | |
| 11 | 11.2 | 9.2 | 3.21 | 1.7 | 3.5 | 0 | |
| 12 | 11.6 | 9.2 | 2.5 | 1.7 | 3.5 | 0 | |
| 13 | 11.5 | 9.8 | 2.4 | 1.7 | 3 | 0 | |
| A | 11.47 | 10.14 | 1.99 | 1.16 | 5 | 1.32 | |
| B | 12.21 | 9.12 | 2.05 | 1.22 | 3.09 | 1.31 | |
| C | 12.21 | 9.12 | 2.05 | 1.22 | 3.09 | 1.31 | |
| D | 12.21 | 9.12 | 2.05 | 1.22 | 3.09 | 1.31 | |
| E | 12.43 | 8.98 | 2.08 | 1.23 | 3.12 | 1.38 | |
| F | 12.43 | 8.98 | 2.08 | 1.23 | 3.12 | 1.38 | |
| G | 11.82 | 9.6 | 2.03 | 1.45 | 3.06 | 1.09 | |
| H | 11.82 | 9.6 | 2.03 | 1.45 | 3.06 | 1.09 | |
| I | 11.16 | 11.36 | 1.94 | 1.03 | 0 | 1.35 | |
| J | 10.58 | 11.4 | 1.98 | 0.961 | 0 | 1.38 | |
| K | 10.85 | 10.89 | 2.45 | 1.02 | 0 | 1.41 | |
| L | 11.84 | 9 | 2.96 | 0.842 | 0 | 1.41 | |
| M | 10.95 | 10.35 | 2.85 | 1.22 | 0 | 1.33 | |
| N | 12.47 | 10 | 2 | 1.09 | 0 | 1.41 | |
| O | 11.91 | 7.74 | 0.98 | 0.71 | 9.95 | 0.27 | |
| P | 13.45 | 8.67 | 0.82 | 0.57 | 13.9 | 0.39 | |
| Q | 11.04 | 11.42 | 0.95 | 1.63 | 0.98 | 0.55 | 0.5 Nb |
| R | 10.66 | 11.49 | 0.95 | 1.63 | 0.98 | 0.57 | 0.51 Nb |
| S | 7.97 | 10.96 | 5 | 0 | 8.55 | 1.21 | |
| T | 8.01 | 11.14 | 4.99 | 0 | 8.62 | 1.22 | |
| U | 10.99 | 11.63 | 1 | 1.56 | 0 | 0 | |
| V | 11 | 11.6 | 1.26 | 1.63 | 0 | 0 | |
| W | 11.03 | 11.59 | 1.26 | 1.6 | 0 | 0 | |

The balance of each example was iron and usual impurities. For Examples 1-13, the impurities included less than 0.01% manganese, 0.01% max. silicon, less than 0.005% phosphorus, less than 0.001% sulfur, 0.002-0.004% carbon, less than 0.01% nitrogen, and less than 0.01% niobium.

Examples A-W correspond to examples described in issued US patents and published US patent applications. The alloys corresponding to Examples A-W in the various references are identified in Table 2 below.

TABLE 2

| Application Ex. | Example ID | Reference |
|---|---|---|
| A | 9 | U.S. 2016/0289805 |
| B | 10 | |
| C | 10 | |
| D | 10 | |
| E | 12 | |
| F | 12 | |
| G | 14 | |
| H | 14 | |
| I | E | U.S. Pat. No. 8,097,098 |

TABLE 2-continued

| Application Ex. | Example ID | Reference |
|---|---|---|
| J | F | |
| K | G | |
| L | H | |
| M | I | |
| N | J | |
| O | M52S-1A | U.S. Pat. No. 7,879,159 |
| P | M52S-2C | |
| Q | 1 | U.S. 2016/0319406 |
| R | 2 | |
| S | 2A | U.S. Pat. No. 6,630,103 |
| T | 2B | |
| U | 25 | U.S. Pat. No. 5,855,844 |
| V | 26 | |
| W | 27 | |

The heats of Examples 1-13 were cast into 4-inch (10.2 cm) tapered square ingots. The ingots were homogenized at 2300° F. (1260° C.) for 24 hours. The ingots were then heated at 2000° F. (1093° C.) for a time sufficient to equalize the temperature and then press-forged to 2¼ inch (5.7 cm) square bars. The as-forged bars were cut and then reheated to 2000° F. (1093° C.). The square bars were then press-forged to 1¼ inch (3.175 cm) square bars, cut, and then reheated to equalize the temperature at 2000° F. (1093° C.). The bars were then single-end press-forged into 11/16-inch (17.5 mm) square bars and then cooled in air to room temperature. The bars were then stress relieved by heating at 1250° F. (677° C.) for 4 hours followed by cooling in air to room temperature.

After the overaging heat treatment, longitudinal test specimens were rough machined from the bars for smooth tensile, Charpy V-Notch impact (CVN), and four-point bending fracture toughness testing. The test specimens of Examples 1-13 were solution annealed at temperatures in the range of 1750-1900° F. (927-1030° C.) for 1 hour, and then quenched in oil to room temperature. After solution annealing, the test specimens were deep chilled at −100° F. (−73° C.) for at least 8 hours and then warmed to room temperature. The specimens were then finish ground to their respective sizes, heated at 925° F. (496° C.) for 12 hours, and then water quenched to room temperature prior to testing.

Examples A-W were prepared, heat treated, and tested as described in the respective patents and published patent applications identified in Table 2.

The results of mechanical testing are presented in Table 3 below including the 0.2% offset yield strength (Y.S.) and the ultimate tensile strength in ksi, the percent elongation (% El.), the percent reduction in area (% RA), the Charpy V-notch impact energy (CVN) in ft-lbs, and the fracture toughness ($K_Q/K_{Ic}$) in ksi√in. Also shown in Table 3 is the ratio of fracture toughness-to-ultimate tensile strength in √in (Ratio) for each example.

TABLE 3

| Ex. | Y.S. | UTS | % El | % RA | CVN | $K_O*/K_{Ic}**$ | Ratio |
|---|---|---|---|---|---|---|---|
| 1 | 269 | 284 | 12 | 53 | 9 | 75* | 0.26 |
| 2 | 262 | 281 | 12 | 53 | 6 | 63* | 0.22 |
| 3 | 262 | 281 | 12 | 51 | 8 | 72* | 0.26 |
| 4 | 262 | 279 | 11 | 54 | 13 | 79.8* | 0.29 |
| 5 | 255 | 274 | 12 | 56 | 13 | 83.3* | 0.30 |
| 6 | 261 | 282 | 11 | 56 | 10 | 69.7* | 0.25 |
| 7 | 267 | 284 | 11 | 54 | 12 | 70.7* | 0.25 |
| 8 | 255 | 275 | 11 | 53 | 15 | 78.6* | 0.29 |
| 9 | 263 | 283 | 7 | 52 | 8 | 67.2* | 0.24 |
| 10 | 262 | 278 | 12 | 54 | 13 | 68* | 0.25 |
| 11 | 263 | 281 | 10 | 51 | 11 | 75.7* | 0.27 |
| 12 | 263 | 280 | 12 | 53 | 13 | 71.6* | 0.26 |
| 13 | 252 | 274 | 11 | 53 | 17 | 84.8* | 0.31 |
| A | 256.4 | 278.4 | 12 | 52 | 11.8 | 51** | 0.18 |
| B | 261.5 | 284 | 13 | 57 | 11 | 53.7** | 0.19 |
| C | 264.3 | 282.7 | 13 | 54 | 9.6 | 57.3** | 0.20 |
| D | 262.8 | 281.8 | 12 | 53 | 7.3 | 52.8** | 0.19 |
| E | 266.9 | 288.5 | 13 | 55 | 10.3 | 47.3** | 0.16 |
| F | 264.2 | 283.3 | 13 | 57 | 9.6 | 51.8** | 0.18 |
| G | 265.6 | 281.8 | 9 | 38 | 5.9 | 54.6** | 0.19 |
| H | 263.2 | 281.4 | 12 | 55 | 5.2 | 50** | 0.18 |
| I | 255 | 273.8 | 9.5 | 53 | 6.6/9.5 | *** | — |
| J | 261 | 275 | 9.14 | 56 | 4.4/5 | *** | — |
| K | 264 | 278 | 9.2 | 53 | 5.9/6.6 | 50.5** | 0.18 |
| L | 260 | 276 | 9.4 | 55 | 5.9 | *** | — |
| M | 275 | 282 | 9.1 | 50 | 4.4 | *** | — |
| N | 240 | 267 | 11.7 | 51 | — | 83.5** | 0.31 |
| O | 266 | 278 | — | — | 7 | *** | — |
| P | 256 | 280 | — | — | 14 | *** | 0.00 |
| Q | 261 | 284 | 10 | 44 | 4 | 46.65** | 0.16 |
| R | 264 | 282 | 10.2 | 46.6 | — | 47.25** | 0.17 |
| S | 263 | 280 | 12 | 49 | — | *** | — |
| T | 269 | 283 | 13 | 53 | — | *** | — |
| U | 238.6 | 257.4 | 13.2 | 58.2 | — | 69** | 0.27 |
| V | 231.3 | 249 | 13.8 | 55.7 | 10 | 72.6** | 0.29 |
| W | 224 | 246.4 | 14.8 | 59 | 21 | 90.9** | 0.37 |

*** Not reported in reference.

Salt spray corrosion testing was performed on duplicate samples from Examples 1-13 in the solution treated and age-hardened condition. All samples were aged at 925° F. (496° C.) for 12 hours and then water quenched to room temperature prior to testing. The samples were tested in accordance with ASTM B117, using a 5% NaCl concentration, natural pH, at 95° F. for the durations shown in Table 4 below. The samples were surface ground with SiC paper finishing with 1200 grit for Examples 1-3 and with 120 grit for Examples 4-13 prior to exposure to the saline spray. The results of the salt spray tests are shown in Table 4 below including the solution heat treatment parameters, the surface finish grit, the test duration, and ratings based on visual inspection of the tested specimens. The rating scale is as follows: 1=no rust, 2=1 to 3 spots of rust, 3=up to 5% of surface rusted, 4=5-10% of surface rusted, 5=10-20% of the surface rusted, and 6=20-24% of the surface rusted.

TABLE 4

| Ex. No. | Solution Treatment | Surface Finish | Duration (hours) | Rating |
|---|---|---|---|---|
| 1 | 1850° F./1 hr/OQ[1] | 1200 grit | 1000 | 1/1 |
| 2 | 1850° F./1 hr/OQ | 1200 grit | 1000 | 1/1 |
| 3 | 1850° F./1 hr/OQ | 1200 grit | 1000 | 1/1 |
| 4 | 1850° F./1 hr/OQ | 120 grit | 408 | 1/1 |
| 5 | 1875° F./1 hr/OQ | 120 grit | 408 | $3^2$/1 |
| 6 | 1825° F./1 hr/OQ | 120 grit | 408 | $1/6^2$ |
| 7 | 1775° F./1 hr/OQ | 120 grit | 408 | 1/1 |
| 8 | 1875° F./1 hr/OQ | 120 grit | 408 | 1/1 |
| 9 | 1800° F./1 hr/OQ | 120 grit | 408 | 1/1 |
| 10 | 1825° F./1 hr/OQ | 120 grit | 408 | $2/2^2$ |
| 11 | 1875° F./1 hr/OQ | 120 grit | 408 | 1/1 |
| 12 | 1850° F./1 hr/OQ | 120 grit | 408 | 1/1 |
| 13 | 1850° F./1 hr/OQ | 120 grit | 408 | 1/1 |

[1]OQ = oil quenched
[2]Upon further inspection of the rusted sample, it was determined that the rusting was initiated at foreign media such as grit embedded in the surface of the sample, not in the matrix metal itself.

Example 1 above provided the best combination of tensile strength, fracture toughness, and corrosion resistance. Therefore, a 400-lb. (181.4 kg) heat having a chemistry essentially the same as that of Example 1 was vacuum induction melted (VIM) and cast as a 6-inch (15.2 cm) VAR electrode. The weight percent composition of the heat is shown as Example 14 in Table 5 below in weight percent.

TABLE 5

| Elmt. | Ni | Cr | Mo | Ti | Co | Al | Mn | Si | P | S | C | N |
|---|---|---|---|---|---|---|---|---|---|---|---|---|
| Ex. 14 | 11.88 | 9.25 | 2.47 | 1.75 | 2.74 | 0.18 | <0.01 | 0.01 | <0.005 | <0.001 | 0.005 | 0.002 |

The balance of the composition was iron and other impurities that were not analyzed.

The electrode ingot was vacuum arc remelted (VAR) into an 8-inch (20.3 cm) ingot. The VAR ingot was homogenized at 2300° F. (1260° C.) for 36 hours and then equalized at 2000° F. (1093° C.). The 8-inch (20.3 cm) ingot was press-forged from 2000° F. (1093° C.) to 6-inch (15.2 cm) square billet. The billet was reheated to 2000° F. (1093° C.), equalized to temperature, and then press-forged to 3.75-inch (9.5 cm) square bar. A length of the 3.75-inch (9.5 cm) bar was further reduced to 1.5-in.×2.75-in. (3.8 cm×6.9 cm) slab.

Standard, longitudinal smooth tensile specimens and standard longitudinal Charpy V-Notch impact (CVN) specimens were prepared from the 3.75-in. (9.5 cm) square bar material (Examples 14A and 14B) and from the 1.5-in.×2.75-in. (3.8 cm×6.9 cm) slab (Examples 14C and 14D). Standard longitudinal 1-inch (2.54 cm) fracture toughness blocks were prepared from the bar material and from the slab material in accordance with ASTM Standard Test Procedure E399. The tensile, CVN, and fracture toughness specimens of Examples 14A, 14B, 14C, and 14D were solution annealed as described in Table 5 below. The specimens were age hardened by heating at 925° F. (496° C.) for 12 hours and then water quenched.

The results of room temperature mechanical testing of Examples 14A, 14B, 14C, and 14D are presented in Table 6 below including the 0.2% offset yield strength (Y.S.) and the ultimate tensile strength in ksi, the percent elongation (% El.), the percent reduction in area (% RA), the Charpy V-notch impact energy (CVN) in ft-lbs, and the fracture toughness ($K_{Ic}$) in ksi$\sqrt{\text{in}}$. Also shown in Table 5 is the ratio of fracture toughness-to-ultimate tensile strength (Ratio) in $\sqrt{\text{in}}$ for each example.

TABLE 5

| Ex. | Solution Treatment | YS | UTS | % El | % RA | CVN | $K_{Ic}$ | Ratio |
|---|---|---|---|---|---|---|---|---|
| 14A | 1750 F./1 Hr/OQ[1] | 261 | 282 | 8 | 26 | 9 | 75 | 0.27 |
| 14B | 1850 F./1 Hr/OQ | 258 | 280 | 9 | 37 | 9 | 72 | 0.26 |
| 14C | 1750 F./1 Hr/OQ[1] | 266 | 284 | 12 | 56 | 14 | 68 | 0.24 |
| 14D | 1850 F./1 Hr/OQ | 259 | 280 | 11 | 52 | 13 | 73.5 | 0.26 |

[1]OQ = oil quench

Figure 1:
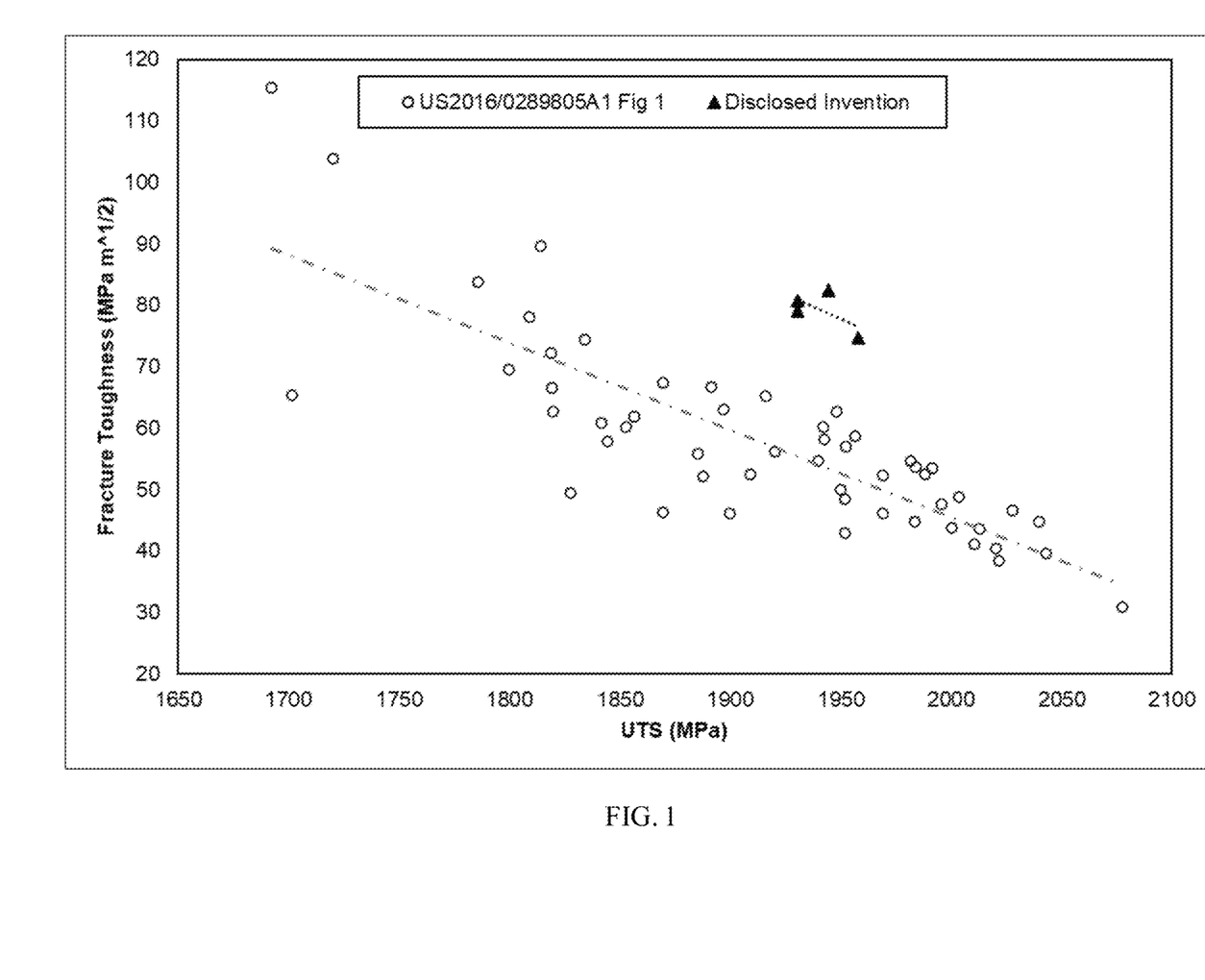
FIG. 1 shows graphs of fracture toughness (MPa$\sqrt{\text{m}}$) as a function of ultimate tensile strength (MPa) for example alloys described in US2016/02899805A1 and for examples of the alloy according to the present invention.
Figure 2:
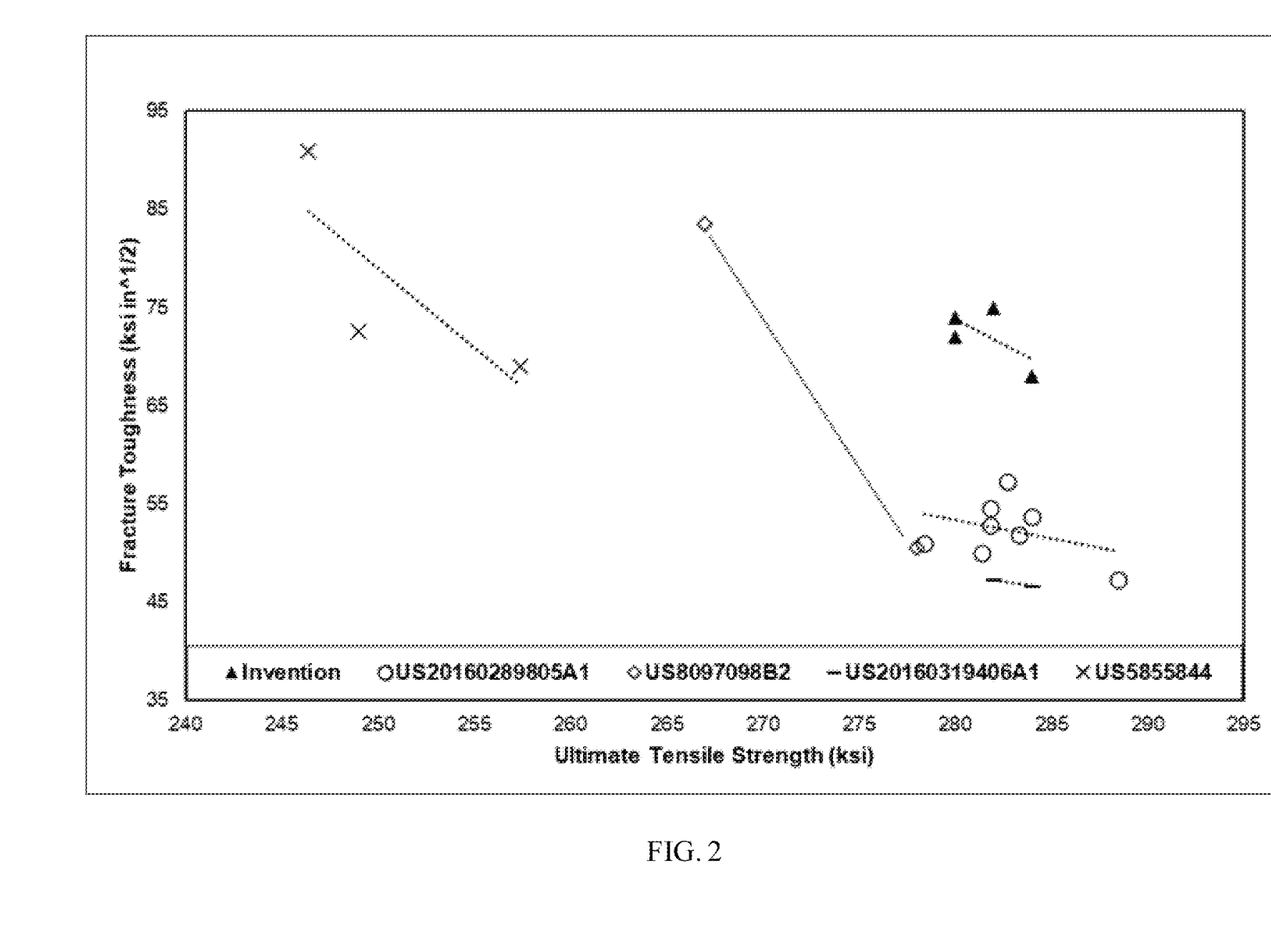
FIG. 2 shows graphs of fracture toughness (ksi$\sqrt{\text{in}}$) as a function of ultimate tensile strength (ksi) for examples of the alloy according to the present invention and for example alloys described in US2016/02899805A1, U.S. Pat. No. 8,097,098B2, US2016/0319406A1, and U.S. Pat. No. 5,855,844.

The significant advantage provided by the Applicant's claimed alloy is illustrated in FIGS. 1 and 2. FIG. 1 shows graphs of fracture toughness as a function of ultimate tensile strength provided by Examples 14A-14D of the claimed alloy (▲'s) and provided by the example alloys described in US 2016/0289805 (○'s). FIG. 2 shows graphs of fracture toughness as a function of ultimate tensile strength provided by Examples 14A-14D of the claimed alloy (▲'s), comparative Examples U, V, and W (x's), comparative Examples K and N (◊'s), comparative Examples A-H (o's), and comparative Examples Q and R (−'s).

Salt-spray corrosion testing in accordance to ASTM B117 was performed on duplicate coupon samples prepared from a 0.25-inch (6.35 mm) thick slice from the 3.75-in. square bar. The salt-spray coupons were surface ground and exposed to a 5% saline (NaCl) mist at 35° C. No rust formation was observed on any of the coupon samples after 200 hours of exposure.

The terms and expressions which are employed in this specification are used as terms of description and not of limitation. There is no intention in the use of such terms and expressions of excluding any equivalents of the features shown and described or portions thereof. It is recognized that various modifications are possible within the invention described and claimed herein.

The invention claimed is:

1. A martensitic, precipitation hardenable stainless steel alloy consisting essentially of, in weight percent:

| | |
|---|---|
| Ni | about 10.5 to about 12.5 |
| Co | about 1.0 to about 6.0 |
| Mo | about 1.0 to about 4.0 |
| Ti | about 1.5 to about 2.0 |
| Cr | about 8.5 to about 11.5 |
| Al | up to 0.2 |
| Mn | up to about 1.0 max. |
| Si | up to about 0.75 max. |
| B | up to about 0.01 max. | and the balance of the alloy is essentially iron and the usual impurities, including, not more than about 0.03% carbon, not more than about 0.03% nitrogen, not more than about 0.04% phosphorus, and not more than about 0.020% sulfur.

2. The alloy as claimed in claim 1 in which aluminum is at least 0.15%.

3. The alloy as claimed in claim 1 in which nickel is at least 11.0%.

4. The alloy as claimed in claim 1 in which cobalt is at least 1.5%.

5. The alloy as claimed in claim 4 in which cobalt is not more than about 5.5%.

6. The alloy as claimed in claim 1 in which molybdenum is at least 2.0%.

7. The alloy as claimed in claim 6 in which molybdenum is not more than about 3.0%.

8. The alloy as claimed in claim 1 in which titanium is at least 1.55%.

9. The alloy as claimed in claim 8 in which titanium is not more than about 1.8%.

10. The alloy as claimed in claim 1 in which chromium is at least 8.75%.

11. The alloy as claimed in claim 10 in which chromium is not more than about 10.5%.

12. A martensitic, precipitation hardenable stainless steel alloy, consisting essentially of, in weight percent:

| | |
|---|---|
| Ni | about 11.0 to about 12.2 |
| Co | about 1.5 to about 5.5 |
| Mo | about 2.0 to about 3.0 |
| Ti | about 1.55 to about 1.8 |
| Cr | about 8.75 to about 10.5 |
| Al | up to 0.2 |
| Mn | up to about 0.25 max. |
| Si | up to about 0.25 max. |
| B | 0.001-0.005 | and the balance of the alloy is essentially iron and the usual impurities, including, not more than about 0.02% carbon, not more than about 0.015% nitrogen, not more than about 0.015% phosphorus, and not more than about 0.01% sulfur.

13. The alloy as claimed in claim 12 which contains at least 0.15% aluminum.

14. The alloy as claimed in claim 12 which contains at least 11.4% nickel.

15. The alloy as claimed in claim 12 which contains at least 2.0% cobalt.

16. The alloy as claimed in claim 15 which contains not more than about 5.0% cobalt.

17. The alloy as claimed in claim 12 which contains at least 2.25% molybdenum.

18. The alloy as claimed in claim 17 which contains not more than about 2.75% molybdenum.

19. The alloy as claimed in claim 12 which contains at least 1.60% titanium.

20. The alloy as claimed in claim 19 which contains not more than about 1.75% titanium.

21. The alloy as claimed in claim 12 which contains at least 9.0% chromium.

22. The alloy as claimed in claim 21 which contains not more than about 10.0% chromium.

23. A martensitic, precipitation hardenable stainless steel alloy, consisting essentially of, in weight percent:

| | |
|---|---|
| Ni | about 11.4 to about 12.0 |
| Co | about 2.0 to about 5.0 |
| Mo | about 2.25 to about 2.75 |
| Ti | about 1.60 to about 1.75 |
| Cr | about 9.0 to about 10.0 |
| Al | up to about 0.2 |
| Mn | up to about 0.10 max. |
| Si | up to about 0.10 max. |
| B | 0.0015-0.0035 | and the balance of the alloy is essentially iron and the usual impurities, including, not more than about 0.015% carbon, not more than about 0.010% nitrogen, not more than about 0.01% phosphorus, and not more than about 0.005% sulfur.

24. The alloy as claimed in claim 23 which contains at least 0.15% aluminum.

25. A method of manufacturing a metal part or component made from the martensitic precipitation hardenable stainless steel alloy as claimed in claim 1 comprising the steps of:
providing an ingot having the composition of the martensitic precipitation hardenable stainless steel alloy as claimed in claim 1 by melting and casting said alloy;
heating the ingot at a temperature of about 2000° F. (1093° C.) to about 2400° F. (1315° C.) for a time sufficient to homogenize said ingot;
hot-working the homogenized ingot to provide a near-net shape part;
annealing the near-net shape part by heating the part at a temperature of about 1700° F. (927° C.) to about 1900° F. (1038° C.) for a preselected period of time;
quenching the annealed part from the annealing temperature to below about −100° F. (−73° C.) to ensure full martensitic transformation of the alloy matrix; and then
age hardening the quenched part by heating at a temperature of 900° F. (482° C.) to about 1150° F. (621° C.) for a time selected to obtain a combination of tensile strength, fracture toughness, and corrosion resistance.

26. An article of manufacture made from the alloy claimed in claim 1 wherein said article of manufacture is characterized by a tensile strength of at least 280 ksi (1930 MPa), a plane strain fracture toughness of at least 60 ksi√in (66 MPa√m), and general corrosion resistance characterized by a rating of about 1 when tested in accordance with ASTM Standard Test Procedure B117.

27. The article of manufacture claimed in claim 26 wherein the article is a structural member for an aircraft.

28. The article of manufacture claimed in claim 27 wherein the structural member is selected from the group consisting of landing gear, landing gear components, flap tracks, and fasteners.

29. The article of manufacture claimed in claim 26 wherein the article is a medical or dental device.

30. The article of manufacture claimed in claim 29 wherein the medical or dental device is selected from the group consisting of dental tools, medical scrapers, cutters, and suture needles.

31. The article of manufacture claimed in claim 26 wherein the article comprises sporting equipment.

32. The article of manufacture claimed in claim 31 wherein the sporting equipment comprises a golf club head.

\* \* \* \* \*

UNITED STATES PATENT AND TRADEMARK OFFICE
CERTIFICATE OF CORRECTION

| | | |
|---|---|---|
| PATENT NO. | : 11,702,714 B2 | Page 1 of 1 |
| APPLICATION NO. | : 17/186813 | |
| DATED | : July 18, 2023 | |
| INVENTOR(S) | : Wesley T. Roth et al. | |

It is certified that error appears in the above-identified patent and that said Letters Patent is hereby corrected as shown below:

In the Claims

Claim 23,
Line 8, "up to about 0.2" should read -- up to 0.2 --

Signed and Sealed this
Twelfth Day of September, 2023

Katherine Kelly Vidal
Director of the United States Patent and Trademark Office